Jan. 17, 1956 E. R. FORD 2,731,059
TIRE CHAIN APPLYING DEVICE
Filed May 5, 1952
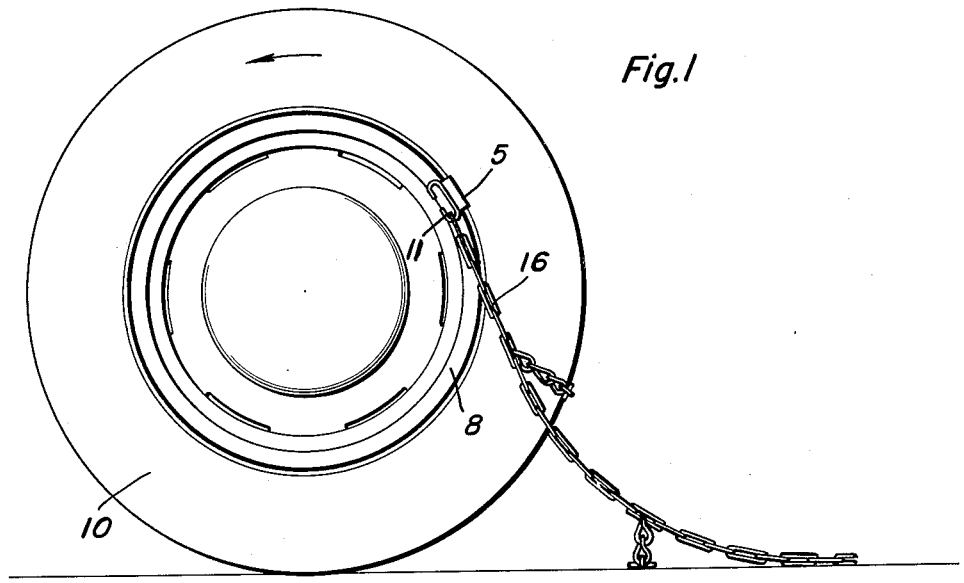
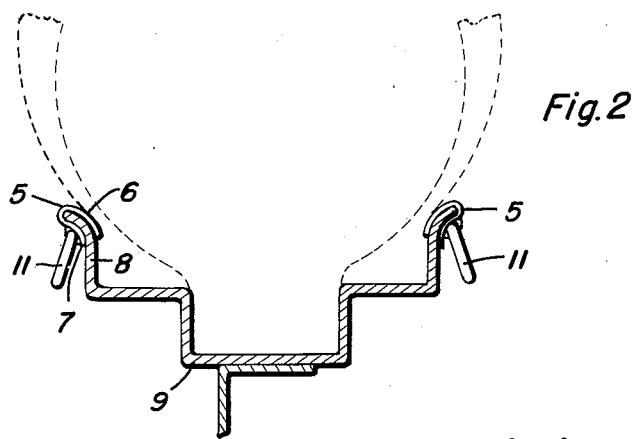
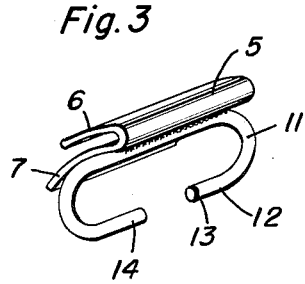
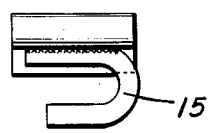
Edward R. Ford
INVENTOR.

United States Patent Office 2,731,059
Patented Jan. 17, 1956

2,731,059

TIRE CHAIN APPLYING DEVICE

Edward R. Ford, Clarksburg, W. Va., assignor of one-half to Carroll N. Stephens, Salem, W. Va.

Application May 5, 1952, Serial No. 286,161

1 Claim. (Cl. 152—213)

The present invention relates to new and useful improvements in tire chain applying devices to facilitate the mounting of anti-skid chains on the wheels of motor vehicles.

An important object of invention is to provide a tire chain applying device adapted for easily and quickly attaching in position on a wheel and embodying means for attaching the ends of a tire chain thereto whereby the chain may be carried around the wheel and brought into position for securing the ends of the chain on the wheel without necessitating jacking of the vehicle.

A further object of the invention is to provide a tire chain applying device which may remain in position on the wheel after the chain has been mounted thereon and without interfering with the normal use of wheel.

A still further object is to provide a device of this character of simple and practical construction, which is strong and durable, efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view;

Figure 2 is an enlarged transverse sectional view of the rim of a wheel showing the chain applying devices in position at each side thereof;

Figure 3 is an enlarged perspective view of the tire chain applying device; and

Figure 4 is a side elevational view of a modified construction.

Referring now to the drawing in detail and first with respect to the form of the invention illustrated in Figures 1 to 3 inclusive, the numeral 5 designates a channel-shaped metal clip constructed to provide an inner flange 6 and an outer flange 7 adapted to engage the flange 8 of an automobile or other motor vehicle wheel 9. The flanges 6 and 7 are curved to conform to the outwardly curved flange 8 of the wheel and the inner flange 6 is forced between the tire 10 and the rim of the wheel and the outer flange 7 is constructed substantially longer than the inner flange 6 to provide a substantially broad bearing surface against the outer surface of the flange 8 of the rim of the wheel.

A hook 11 is welded or otherwise suitably secured to the outer flange 7 of the clip and in a position with the bill portion 12 of the hook inclined outwardly with respect to the clip.

The hook 11 may be constructed to provide a pair of opposed bill portions 13 and 14, as illustrated in Figure 3 of the drawing, or the clip may be provided with a single hook 15, as shown in Figure 4.

In applying a tire chain to the tire 10 of the wheel one of the clips 5 is placed in position on both the inner and outer flanges 8 of the tire rim 9 of the wheel and one end of each of the circumferential chain members 16 of the tire chain is engaged with the hook 11 of the pair of clips. The vehicle may then be rolled forwardly carrying the chain with it until the wheel makes a complete revolution whereupon the free ends of the circumferential side chain members 16 of the tire chain may also be secured to the hook 11 of the chain applying device, or the ends of the chain secured together in the usual manner.

If desired the chain applying device may be left in position on the wheel, or removed therefrom after the chain has been mounted thereon.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and the scope of the appended claim.

Having described the invention, what is claimed as new is:

In combination with a wheel rim having a tire mounted thereon, a tire chain applying and securing device for applying and securing an annular tire chain about the periphery of the tire, said device comprising a pair of channel shaped clips firmly embracing opposite flanges of the wheel rim in axial alignment with each other, said clips each including an integral inner and outer flange, said inner flange being positioned between the wheel rim and said tire, said outer flange being of a width substantially greater than the width of said inner flange to provide a greater bearing surface for said clip against the outer surface of the rim flange, and a composite hook member rigidly secured to the outer flange of each clip at the side of said wheel rim and providing a pair of hooks having opposed bill portions inclined axially outwardly and radially inwardly and arranged in spaced, coaxial relationship, each said hook being adapted to engage and secure an end of said tire chain.

References Cited in the file of this patent

UNITED STATES PATENTS

| | | |
|---|---|---|
| 451,097 | Wilkinson | Apr. 28, 1891 |
| 1,194,433 | Silberman | Aug. 15, 1916 |
| 2,221,747 | Turner | Nov. 19, 1940 |
| 2,344,971 | Copp | Mar. 28, 1944 |
| 2,583,879 | Pohl | Jan. 29, 1952 |
| 2,675,845 | Donaldson | Apr. 20, 1954 |
| 2,681,681 | Muller | June 22, 1954 |